United States Patent [19]
Sato

[11] 4,128,031
[45] Dec. 5, 1978

[54] HORIZONTAL BANDSAW MACHINES
[75] Inventor: Masao Sato, Hatano, Japan
[73] Assignee: Amada Company, Limited, Isehara, Japan
[21] Appl. No.: 830,180
[22] Filed: Sep. 2, 1977
[30] Foreign Application Priority Data
  Sep. 8, 1976 [JP] Japan ............................. 51-107591
[51] Int. Cl.² ................... B23D 55/08; B27B 13/06
[52] U.S. Cl. ................................. 83/820; 83/788; 83/814
[58] Field of Search ............... 83/788, 820, 814, 816, 83/808
[56] References Cited
  U.S. PATENT DOCUMENTS
  918,248   4/1909  Wysong ........................... 83/788
  1,916,903 7/1933  Wine ................................ 83/820
  2,976,738 3/1961  Bascom ......................... 83/814 X
  3,363,495 1/1968  Turnbull ....................... 83/788 X
  4,027,568 6/1977  Cleland ............................ 83/788

FOREIGN PATENT DOCUMENTS
  731246 6/1955 United Kingdom ................. 83/788

Primary Examiner—Donald R. Schran
Attorney, Agent, or Firm—Thompson, Birch, Gauthier & Samuels

[57] ABSTRACT

A bandsaw wheel having laterally spaced grooves in the periphery thereof. Annular rubber-like members are received in the grooves and protrude therefrom beyond the wheel periphery to provide radial support for a bandsaw blade at a plurality of laterally spaced locations.

2 Claims, 4 Drawing Figures

U.S. Patent
Dec. 5, 1978
4,128,031
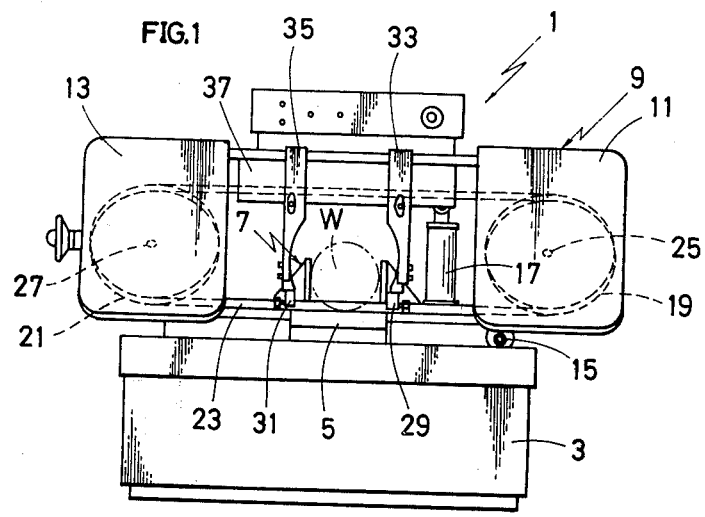
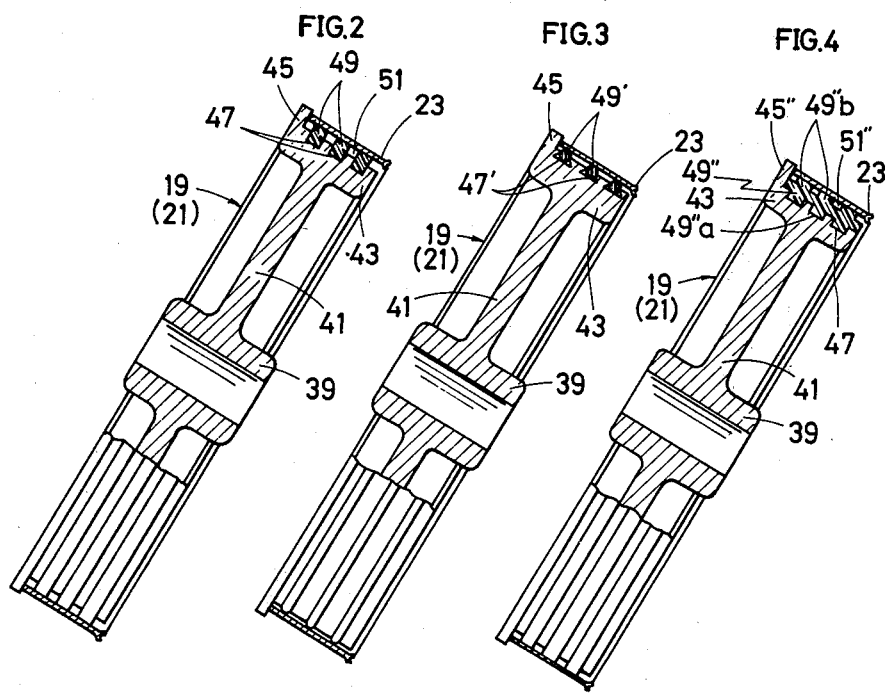

HORIZONTAL BANDSAW MACHINES

BACKGROUND OF THE INVENTION

1. Field of the Invention

The present invention relates generally to so-called horizontal bandsaw machines and, more particularly, to bandsaw wheels or pulleys of such horizontal bandsaw machines around which endless bandsaw blades are trained.

2. Description of the Prior Art

The type of horizontal bandsaw machines with which the present invention is concerned are provided with a saw head assembly including bandsaw wheels or pulleys which are mounted for rotation on spaced substantially parallel axes and around which an endless bandsaw blade is trained. One of the bandsaw wheels is driven and acts as a driving wheel to drive the bandsaw blade through frictional engagement between one flat side of the bandsaw blade and the peripheral face of the driving bandsaw wheel. Also, in order to adequately tension the bandsaw blade, one of the bandsaw wheels is drawn or biased together with its shaft in a radial direction away from the other wheel. Furthermore, one of the stretches of the bandsaw blade between the bandsaw wheels is slidably guided and held by a plurality of guide means with its flat sides perpendicular to a work table on which workpieces to be cut are placed. Thus, the horizontal bandsaw machines are so designed that the saw head assembly is lowered towards the work table so that the bandsaw blade travelling around the bandsaw wheels may cut the workpieces placed on the work table.

Such horizontal bandsaw machines have been much improved after continuous efforts over a long period of years and they are now widely used in many industries and at many large and small factories and shops as the most advantageous and economical means for cutting a wide variety of materials.

Unfortunately, however, certain problems with these known horizontal bandsaw machines have remained unsolved, particularly with regard to the bandsaw wheels which are the most fundamental elements thereof.

One of these problems lies in the fact that the bandsaw blade will produce a very keen screeching noise especially on the bandsaw wheels when making cutting operations. This noise is caused primarily by the fact that the bandsaw blade vibrates severely against the peripheral surfaces of the bandsaw wheels during the cutting operations. This noise is apt to become an issue as a noise pollutant, especially since the bandsaw machines are very widely used even at small factories and shops in non-industrial areas.

The vibration of the bandsaw blade causing the keen and screechy noise occurs primarily from the fact that the bandsaw blade will be vibrated inherently because of its flexible nature not only sidewise or laterally but also breadthwise or vertically when making cutting operations. Blade vibration is increased or amplified because of the fact that there is a larger tensile stress in the stretch of the bandsaw blade leaving the workpiece as compared to the stretch approaching the workpiece because the bandsaw blade is driven and pulled by the driving bandsaw wheel under a strong tension. Accordingly, the vibration and the resultant noise of the bandsaw blade occur most severely where the bandsaw blade is cutting into the workpieces. Although the undesirable vibration of the bandsaw blade is reduced by the sawblade guide means for slidably guiding the bandsaw blade, the fact is that the vibration is too severe to be desirably reduced only by the guide means.

In addition to causing the above-described noise, the vibration of the bandsaw blade also has a bad influence on the rate and accuracy of the cut, as well as on the life of the blade. Also, blade vibration causes spraying of the cutting lubricant. Vibration of the bandsaw blade will also produce a rough cut, with the entry end of the kerf being wider than the remainder, making it difficult if not impossible to obtain a smooth straight cut. Since as mentioned above, the bandsaw blade is vibrated in two planes (sidewise and breadthwise) and thus is apt to be floating, the cutting rate also will be adversely affected. Also, the sidewise vibration of the bandsaw blade will result in excessive blade wear. Furthermore since the vibrating bandsaw blade will spray the cutting lubricant like a mist, the lubricant is lost out of the bandsaw machine without being recovered and splashes the operators and the surrounding environment of the bandsaw machine.

Another bothersome problem of the conventional horizontal bandsaw machines is the fact that the bandsaw blade is apt to slip on the bandsaw wheels. Such slippage results from the fact that the bandsaw blade is always flooded or bathed with cutting lubricant during cutting operations and such lubricant is carried onto the peripheral surfaces of the bandsaw wheels by the bandsaw blade and consequently a film of the lubricant will be created between the bandsaw blade and the peripheral surfaces of the bandsaw wheels. Slippage of the bandsaw blade on the bandsaw wheels will damage the bandsaw blade by slowing the blade down as it is forced into the workpiece. Although the slippage of the bandsaw blade can be overcome to some extent by increasing the tension of the bandsaw blade between the bandsaw wheels, too much tension will also cause premature blade wearing and breakage.

Thus, it will be seen that there exists a real need for an improved horizontal bandsaw machine incorporating means for both eliminating or at least substantially minimizing both blade vibration and slippage.

SUMMARY OF THE INVENTION

It is a primary object of the present invention to provide a horizontal bandsaw machine in which the noise produced by the bandsaw blade is minimized.

It is another object of the present invention to provide a horizontal bandsaw machine in which the vibration of the bandsaw blade is minimized.

It is a further object of the present invention to provide a horizontal bandsaw machine in which the bandsaw blade will not slip on the bandsaw wheels.

Accordingly, it is also an object of the present invention to provide a horizontal bandsaw machine in which the cutting rate and the cutting accuracy are improved and also the life of the bandsaw blade is lengthened.

Basically, these objects are accomplished by providing a horizontal bandsaw machine with bandsaw wheels which are provided with means for absorbing vibration and affording friction.

In this connection, it is a still further object of the present invention to provide a horizontal bandsaw machine in which such means for absorbing vibration and affording friction can be easily incorporated into the bandsaw wheels.

Other and further objects and advantages of the present invention will be apparent from the following description and accompanying drawings which, by way of illustration, show a preferred embodiment of the present invention and the principle thereof.

BRIEF DESCRIPTION OF THE DRAWINGS

FIG. 1 is a front elevational view of a horizontal bandsaw machine embodying the principles of the present invention.

FIG. 2 is a side view showing partially in section a portion of the horizontal bandsaw machine embodying the principles of the present invention.

FIG. 3 is a side view similar to FIG. 2.

FIG. 4 is a side view similar to FIGS. 2 and 3.

DESCRIPTION OF THE PREFERRED EMBODIMENTS

Referring now to the accompanying drawings, a horizontal bandsaw machine generally designated by the numeral 1 includes an oblong box-like base 3 on which a work table 5 is provided, a vise 7 which is mounted on the work table 5 to clamp the workpiece W and a saw head assembly 8 which is of a substantially C-shaped construction and forms spaced housing sections 11 and 13.

The saw head assembly 9 is so designed as to be swung up and down towards and away from the vise 7 around a hinge pin 15 by any suitable means such as by hydraulic linear actuator 17. However, it will be understood that the present invention is applicable to any known type of horizontal bandsaw machine such, for example, as that in which a saw head assembly 9 is vertically raised and lowered in its entirety along a single or plural vertical guide means.

Inside the housing sections 11 and 13 of the saw head assembly 9, there are provided driving and driven bandsaw wheels or pulleys 19 and 21 around which an endless bandsaw blade 23 is trained. The driving and driven bandsaw wheels 19 and 21 are mounted for rotation on spaced parallel shafts 25 and 27, respectively, and are substantially radially aligned with each other. Also, in order to adequately tension the bandsaw blade 23, one of the wheels which is usually the driven wheel 21 is pulled or biased together with its shaft 27 away from the other wheel 19 by a suitable conventional means. The driving wheel 19 is driven by a suitable motor, not shown, usually in a counterclockwise direction so as to drive and impart orbital motion to the bandsaw blade 23 trained therearound, while the driven wheel 21 is freely rotatable. Since the bandsaw wheels 19 and 21 are focuses of the invention, they will now be described in greater detail.

The bandsaw blade 23 is trained over the bandsaw wheels 19 and 21 in a manner such that its cutting edge is projected from the axial inner ends of the bandsaw wheels 19 and 21. Also, the bandsaw blade 23 is slidably guided and held by guide means 29 and 31 with its flat sides perpendicular to the work table 5 at a cutting zone where cutting is performed.

The guide means 29 and 31 for guiding and holding the bandsaw blade 23 are detachably fixed to the lower ends of supporting arms 33 and 35, respectively, which depend downwardly from a beam 37 fixed to the saw head assembly 9. Either or both of the supporting arms 33 and 35 can be adjustably moved along the beam 37 in directions parallel to the stretch of the bandsaw blade 23 so as to adjust the span between the guide means 29 and 31 according to the cross-sectional lengths of the cut to be made on the workpiece W. Also, the guide means 29 and 31 are usually so designed as to supply the bandsaw blade 23 with cutting lubricant. Although the guide means 29 and 31 are effective in reducing the vibration of the bandsaw blade 23, the vibration is too severe to be reduced only by them and accordingly the bandsaw blade 23 is apt to remain still severely vibrating while travelling around the bandsaw wheels 19 and 21.

As is now readily apparent, the bandsaw blade 23 travelling around the bandsaw wheels 19 and 21 will cut the workpiece W clamped by the vise 7 on the work table 5 as the saw head assembly 9 is lowered towards the work table 5. One of the fundamental problems lies in the fact that the bandsaw blade 23 will be severely vibrated primarily between the workpiece W to be cut and the driven wheel 21 because of the fact that there is a larger tensile stress in the stretch of the bandsaw blade 23 between the workpiece W and the driving wheel 19 than in the stretch between the workpiece W and the driven wheel 21. As a result, the bandsaw blade 23 is apt to remain vibrating in its entirety while travelling around the driving and driven wheels 19 and 21. Also, another fundamental problem is that the cutting lubricant will be carried onto the peripheral surfaces of the bandsaw wheels 19 and 21 by the bandsaw blade 23 with the result that it is apt to cause the slippage of the bandsaw blade 23 on the bandsaw wheels 19 and 21.

According to the present invention, the driving wheel 19 and the driven wheel 21 are so designed as to reduce the vibration of the bandsaw blade 23 and prevent the slippage of the same. The driving and driven wheels 19 and 21 may be identical in construction to each other, for the purposes of the invention, although of course they are more or less different in function from each other. Accordingly, the further description will refer to both wheels as "bandsaw wheel 19, 21".

In general, the bandsaw wheel 19, 21 comprises a hub 39 in which the shaft 25, 27 is inserted, a disk-like web 41 formed on the hub 39 to radially project therefrom, an annular rim 43 formed on the periphery of the disk-like web 41 and an annular flange 45 radially projecting from one axial end of the annular rim 43. In the drawings, the annular rim 43 is shown as projecting axially from the periphery of the disk-like web 41 in both axial directions, but it may be so disposed as to project only in one axial direction from the web 41. Thus, the bandsaw blade 23 is trained over the periphery of the annular rim 43 in a manner such that its back edge is adjacent to and in parallel with the inner surface of the annular flange 45 and its cutting edge is projected beyond the axial end of the annular rim 43 remote from the flange 45. The flange 45 acts as a stop to prevent the bandsaw blade 23 from drifting laterally from its intended path, so as to keep the cutting edge of the bandsaw blade 23 protruding beyond the annular rim 43 without being damaged thereby.

As shown in FIG. 2, the annular rim 43 of the bandsaw wheel 19, 21 is provided at its periphery with a plurality of circumferentially extending annular grooves 47, and also there is provided in each of the grooves 47 an annular rubber-like member 49 such as polyurethane or the like which may absorb vibration and afford friction. The annular grooves 47 are preferably equi-spaced axially on the periphery of the annular rim 43, and the annular rubber-like members 49 should protrude radially outwardly from the periphery of the annular rim 43. Accordingly, a plurality of circumferentially extending gutters or ditches 51 are formed between the annular rubber-like members 49 on and around the periphery of the rim 43 of the bandsaw wheel 19, 21. Thus, it will be understood that the bandsaw blade 23 travels on the annular rubber-like members 49 around the periphery of the bandsaw wheel 19, 21 without contacting the peripheral surface of the rim 43 of the bandsaw wheel 19, 21.

Thus, the annular rubber-like members 49 are effective not only to absorb the vibration of the bandsaw blade 23 but also to prevent the bandsaw blade 23 from contacting the peripheral surface of the rim 43 of the bandsaw wheel 19, 21. Accordingly, the vibration and the screechy noise of the bandsaw blades 23 are greatly reduced.

Also, the gutters 51 between the annular rubber-like members 49 are effective to receive the cutting lubricant carried onto the periphery of the bandsaw wheel 19, 21 by the bandsaw blade 23 and therefore no film of the cutting lubricant is created between the bandsaw blade 23 and the periphery of the bandsaw wheel 19, 21. Furthermore, the annular rubber-like members 49 will apply a localized pressure to the bandsaw blade 23, since the pressure exerted to tension the bandsaw blade 23 is localized at the rubber-like members 49. Accordingly, the bandsaw blade 23 can be prevented from slipping on the bandsaw wheel 19, 21.

As shown in FIG. 3, each of the annular grooves 47' of the bandsaw wheel 19, 21 may be so designed that its radially outer portion is smaller in axial cross section than its radially inner portion, and each of the annular rubber-like members 49 may be of any cross-sectional shape which snugly fits in each of the grooves 47 and outwardly projects therefrom. In FIG. 3, each of the annular grooves designated by 47' is formed like a dovetail groove having a narrower outermost opening and a wider innermost bottom, while each of the annular rubber-like members designed by 49' is a ring which is round in cross-section. The arrangement is such that the annular rubber-like rings 49' can be resiliently forced into the dovetail-like grooves 47' through their outermost openings and are kept radially outwardly projected therefrom even when pressed by the bandsaw blade 23.

Thus, it will be readily understood that the annular rubber-like rings 49' of an elastic nature can be resiliently forced into the dovetail-like grooves 47' through their narrower outermost openings but they are firmly held in the dovetail-like grooves 47' even while the bandsaw wheel 19, 21 is rotating. Also, the annular rubber-like rings 49' can be easily installed onto the bandsaw wheel 19, 21 both in initial assembling and in replacements of old worn ones.

In FIG. 4, there is shown a modified embodiment in which mounted around the periphery of the annular rim 43 of the bandsaw wheel 19, 21 is a single annular rubber-like member 49" having inner flange portions 49"a of the same number as the grooves 47 (47') and a plurality of outer flange portions 49"b. The modified annular rubber-like member 49" is of an even thickness and covers the periphery of the rim 43 of the bandsaw wheel 19, 21. The inner flange portions 49"a of the annular rubber-like member 49" project radially inwardly into the grooves 47 (47') and are retained therein. Also, the outer flange portions 49"b of the annular rubber-like member 49" all project radially outwardly an equal amount from the level of the periphery of the annular rubber-like member 49" in such a manner as to form gutters 51" therebetween and function all in the same manner as the annular rubber-like members 49 and 49' of the other embodiments. Of course, the annular flange 45" of the bandsaw wheel 19, 21 in this case has to be radially thicker than in the cases shown in FIGS. 2 and 3 by a thickness of the body of the annular rubber-like member 49". Thus, the modified annular rubber-like member 49" is held on and around the periphery of the bandsaw wheel 19, 21 with its inner flange portions 49"a in the grooves 47 (47') and fulfills in its entirety the same functions as the annular rubber-like members 49 and 49' in the other embodiments.

As has been described, the bandsaw wheels 19 and 21 of the horizontal bandsaw machine 1 according to the present invention are provided at their peripheries with the annular rubber-like members 49, 49' or 49" which are made of a material such as polyurethane or the like having appropriate physical characteristics for absorbing vibration and affording friction. However, such arrangements need not necessarily be made on all of the driving and driven wheels 19 and 21. The keen and screechy noise is much reduced by making the arrangements on the driven wheel 21 only in the horizontal bandsaw machine 1 of the type shown in FIG. 1, since the noise will occur most severely on the driven wheel 21 as has been earlier described in the above. Of course, however, it is the most desirable to make the arrangements on all of the driving and driven wheels 19 and 21 so as to reduce the vibration and resultant noise of the bandsaw blade 23 and prevent the slippage of the same as completely as possible.

As has been so far described, the horizontal bandsaw machine 1 according to the present invention has been much improved to solve the various conventional problems by improving the bandsaw wheels 19 and 21 which have been apt to be considered simple and insignificant.

Firstly, it is a marked feature of the horizontal bandsaw machine 1 of the invention that the undesirable screechy noise is reduced to the minimum, basically since the bandsaw blade 23 causing the noise travels on the rubber-like members 49, 49' or 49" around the peripheries of the bandsaw wheels 19 and 21. Needless to add, the bandsaw blade 23 is prevented from producing the noise because of the rubber-like members 49, 49' or 49", since it is restrained from severely vibrating and also it will not directly contact the rim 43 of each of the driving and driven wheels 19 and 21.

In this connection, actual tests in cutting a stainless steel bar (JIS (=Japanese Industrial Standard) : SUS-304) having a diameter of 250 mm. revealed that an average noise level of 95 db. (decibels) in cutting with the conventional horizontal bandsaw machines is reduced to an average of 76 db. in cutting with the driven wheel 21 only equipped with the rubber-like members (49'). Since the loudness of the noise is thus remarkably reduced even with the driven wheel 21 only arranged according to the invention, it will be much more reduced if all of the driving and driven wheels 19 and 21 are arranged according to the invention. Thus, the horizontal bandsaw machine 1 according to the present invention will not be harmful to the health of the operators of the machine. Also, the very feature that the noise is greatly reduced in the horizontal bandsaw machine 1 of the invention is much appreciated nowadays since industrial noises are apt to become issues as noise pollutants.

A basic feature of the inventive horizontal bandsaw machine 1 is that the vibration of the bandsaw blade 23 is absorbed by the rubber-like members 49, 49' or 49" and this feature will bring about further advantages. Since the bandsaw blade 23 will cut into the workpieces W straight without sidewise vibrating, the cutting accuracy is increased with regard to both of the straightness of the cuts and the surface roughness of the cut workpieces W. Since the bandsaw blade 23 is restrained from vibrating sidewise and breadthwise, the cutting rate of the bandsaw blade 23 will be increased. Also, the life of the bandsaw blade 23 is increased, since the sidewise vibration of the bandsaw blade 23 is minimized and accordingly the excessive wear of the bandsaw blade 23 without performing cutting is minimized. Furthermore, although the vibration of the bandsaw blade 23 will cause the cutting lubricant to spray like a mist in the conventional horizontal bandsaw machines, such a mist of cutting lubricant is not seen in the horizontal bandsaw machine 1 according to the present invention and accordingly the cutting lubricant will not be lost out of the machine and will not splash the operators and the area surrounding the machine.

Another basic feature of the inventive horizontal bandsaw machine 1 is that the bandsaw blade 23 will not slip on the bandsaw wheels 19 and 21, since the cutting lubricant carried onto the peripheries of the bandsaw wheels 19 and 21 by the bandsaw blade 23 is forced into the gutters 51 and 51" between the rubber-like members 49, 49' or the outer flange portions 49"b of the rubber-like member 49". The bandsaw blade 23 will be prevented from slipping also since the pressure applied to the bandsaw blade 23 to tension the same is localized on the rubber-like members 49, 49' or the outer flange portions 49"b of the rubber-like member 49". Thus, the bandsaw blade 23 is completely prevented from slipping on the bandsaw wheels 19 and 21 without the need to resort to excessive tension on the bandsaw blade 23. Accordingly, the bandsaw blade 23 will not be broken or snapped because of too much tension on the same in the horizontal bandsaw machine 1 according to the present invention. Also, since the bandsaw blade 23 is positively prevented from slipping on the bandsaw wheels 19 and 21, it will not be slowed or stopped while being forced into the workpieces to be cut, which in turn minimizes the possibility of the bandsaw blade 23 itself and its teeth being broken because of the slippages. Thus, the life of the bandsaw blade 23 will be lengthened in the horizontal bandsaw machine 1 according to the present invention.

In this connection, the slippage of the bandsaw blade 23 on the bandsaw wheels 19 and 21 will be prevented only by the grooves 47 or 47' without the rubber-like members 49, 49' or 49", since the peripheral surfaces between the grooves 47 or 47' of the rim 43 will fulfill the same functions as the rubber-like members 49, 49' or 49" for the purpose of preventing the slippage of the bandsaw blade 23. Of course, without the rubber-like members 49, 49' and 49", the vibration and the resultant noise could not be reduced and the whole objects of the invention could not be performed. However, it is still one of the advantages of the horizontal bandsaw machine 1 of the invention that the bandsaw wheels 19 and 21 can be used without the rubber-like members 49, 49' or 49" but with the effect of preventing the slippage of the bandsaw blade 23 after the rubber-like members 49, 49' or 49" have been worn down and until new ones can be obtained and installed.

Furthermore, it is another important feature of the horizontal bandsaw machine 1 according to the present invention that the rubber-like members 49, 49' and 49" can be easily installed on the bandsaw wheels 19 and 21.

Although preferred forms of the present invention have been illustrated and described, it should be understood that the devices are capable of modification by one skilled in the art without departing from the principles of the invention. Accordingly, the scope of the invention is to be limited only by the claims appended hereto.

I claim:

1. In a bandsaw having a bandsaw blade trained around at least one bandsaw wheel rotatably carried on a cutting head, the improvement comprising: laterally spaced grooves in the periphery of said wheel, said grooves each being dovetailed in cross-section with the wider groove section being at the groove bottom, and annular rubber-like members with round cross-sections received in said grooves and protruding therefrom beyond the wheel periphery to provide radial support for the bandsaw blade at a plurality of laterally spaced locations.

2. In a bandsaw having a band saw blade trained around at least one bandsaw wheel rotatably carried on a cutting head, the improvement comprising: a unitary rubber-like band surrounding the periphery of said wheel, said band having laterally spaced integrally formed inner flanges received in grooves in said wheel, and laterally spaced outer flanges in contact with said blade.

* * * * *